R. MARCHER.

Enameling Machine.

No. 674. Reissued March 15, 1859.

Witnesses:
Peter Vandervoort.
Thomas Paul Outwork

Inventor:
Robert Marcher.

N. PETERS. Photo-Lithographer, Washington, D. C.

UNITED STATES PATENT OFFICE.

ROBERT MARCHER, OF NEW YORK, N. Y.

IMPROVEMENT IN MACHINERY FOR ENAMELING MOLDINGS, &c.

Specification forming part of Letters Patent No. 8,448, dated October 21, 1851; Reissue No. 674, dated March 15, 1859.

*To all whom it may concern:*

Be it known that I, ROBERT MARCHER, late of Cornwall, county of Orange, and State of New York, now of the city of New York, have invented a new and useful Improvement in Machinery or Apparatus for Applying Enamel to Moldings and other Like Articles of Wood; and I do hereby declare that the following is a full, clear, and exact description of the same, reference being had to the accompanying drawings, making part of this specification, in which—

Figure 2:
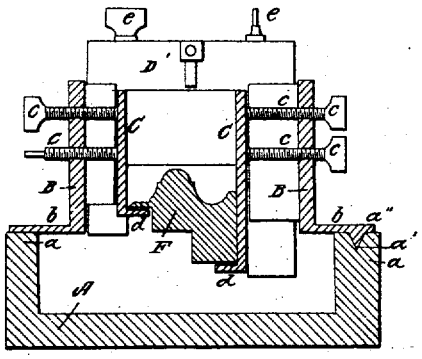
Figure 1:
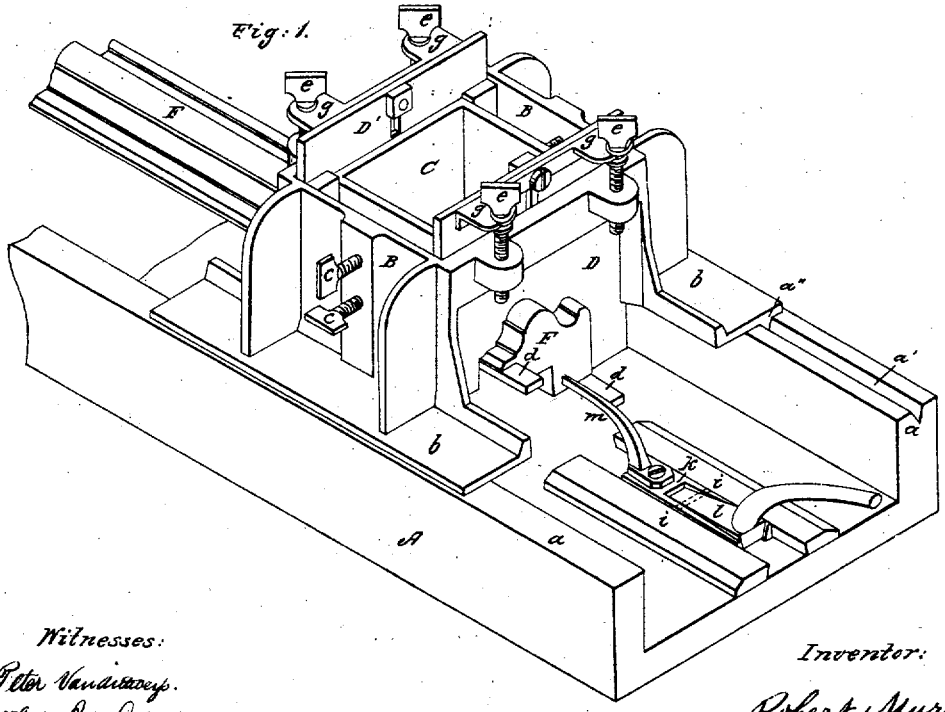

Figure 1 is a perspective view. Fig. 2 is a transverse section.

Similar letters refer to similar parts throughout.

My invention relates to machinery for applying the composition to the surface of wood moldings in the process of preparing them for gilding, as well as for the purpose of making a finished enameled surface upon all materials capable of being treated in this manner.

The construction and operation are as follows:

A represents a table or bench of a length sufficient to receive the moldings or other articles to be enameled, the said bench being provided with two parallel ways, *a a*, the upper surface of one being formed with a groove, *a'*, to receive and guide a tongue, *a''*, attached to the apparatus for laying the composition. This apparatus (represented at B) is a carriage for carrying the composition—such as is used for enameling—having the top and bottom open, and the two ends cut out to a sufficient extent to receive the largest moldings which may be required to be enameled. The lower part of the sides terminates in flanges *b b*, which rest on the ways *a a*, one of them having the guide-piece *a''* projecting from its under face. Within this carriage there is a box or hopper, C, of nearly the same length as the inside, but narrower, and with the top and bottom open. It can be raised or lowered and moved to one side or the other, as may be required, by means of screws *c c c c*, tapped into the sides of the carriage, the ends of which grip the sides, so that by turning these screws the said box or hopper can be liberated for adjustment, and then firmly held in position. The two sides of this hopper are generally of unequal width, one being deeper than the other, and there should be several of them to suit different-sized moldings. The bottom edges of the two sides terminate in flanges *d*, extending below the molding, one under the rabbet and the other under the inner edge of the molding, as represented. There are two plates, D D', of sufficient width to fit in the ends of the carriage so as to slide up and down freely, but yet making a close fit between the ends of the box C and the end of the carriage B. The lower edge of these plates is of a form the reverse of the molding to be coated or enameled, as represented, there being one set of such plates for each kind of molding. These plates are adjustable toward and from the surface of the molding by means of set-screws *e e e e*, tapped into the ends of the carriage, and formed with collars to embrace ears *g g g g*, projecting from the upper ends of the plates.

F represents a piece of molding secured in place above the table A by means of suitable dogs. At one end the dogs may be permanent, but at the other it should be adjustable, and may be constructed as exhibited in the drawings. Two pieces, *i i*, are attached to the top of the table, forming a dovetail groove between them, to which is fitted a sliding piece, *k*, forked at its rear end. The dog *m* is attached to this sliding piece *k*, and its forward end is suitably formed to hold the molding when driven into it. After the molding has been driven against the stationary dog at the other end, the dog *m* is driven in and held firmly in place by a wedge, *l*, which is forced down between the forks of the slide *k*, which are thereby forced outward against the sides of the dovetail groove to hold the dog firmly in place.

The operation is as follows: The molding to be enameled being secured in place, and the carriage brought to one end, the plates D D' are set down by the screws *e* so as to press lightly upon the molding, while the carriage rests on the ways *a a*, there being sufficient space left between the flanges *d d* and the under part of the molding to allow for the intended thickness of the enamel to be put down the upper or molding surface. The composition to be applied is put in the box or hopper C in a semi-fluid condition, which is prevented from running out at bottom by the surface of the molding at the sides, by the sides of the hopper C, and at the front end by the plate D′, which simply forms one end of the hopper, that being its sole function; and the material is also prevented from escaping at the front end by the plate D′, which, while the carriage is at rest, acts as one end of the hopper C. The carriage is then moved forward to the other end of the molding, and as the surface of the molding constitutes the bottom of the hopper the semi-liquid material coats in succession every part of the surface. The lower edge of the plate D, which before starting was set in contact with the surface of the molding, when in motion determines the thickness of the coat of enamel to be left on the surface of the molding. As the carriage, with all its appendages, is simply held down by gravity, and the lower edge of the plate D simply rests on the surface of the molding by gravity, and as there is sufficient play left between the under surface of the molding and the flanges *d d* of the hopper, the whole is permitted to rise as the edge of the plate D meets with the resistance presented by the adhesion of the coating of enamel on the surface of the molding, and this it is that determines the thickness of the coating left. The passage of the edge of the plate D not only equalizes the thickness of the coating, but smooths the surface, and as it rests on the surface by gravity alone it is self-adapting to accommodate itself to any irregularity in the surface of the molding, longitudinal or transverse, as it is moved from end to end.

To fill up all the pores of the wood, and to obtain a smooth surface suitable for gilding or for other purposes, it is necessary to apply several coats of the composition, which is done by repeating the operation; but if the flanges *d d* are employed, and in setting the hopper C or the molding sufficient space is not left between these flanges and the under face of the molds to give the amount of play required for the ultimate thickness of the enamel, then care should be taken to reset the plates D D′ at the end of each movement, if required, so that their lower edges shall just touch the surface when the carriage rests on its ways.

It may be well to add that the thickness of each coat of enamel will depend upon several things—viz., the consistency of the composition, which, however, should not be varied much; the thickness of the lower edge of the plates D D′, and the weight or pressure of the carriage relatively to the width of the moldings, so that the operative in moving the carriage may, at pleasure, increase the pressure with his hand, or the carriage may be made heavier.

There are some modifications of this machine which may be suggested, and certain parts substituted for others. Thus, instead of the box C formed in one piece, two plates formed like the sides of C may be substituted. When such plates are used, the points of the screws *c*, instead of merely pressing against the sides, as at present, should be connected to them by passing through and holding by a pin and washer, or like contrivance, on the inside, so that while setting up the plates a shoulder turned on near the point would take the pressure, and, on unscrewing, the plates would be drawn back by the washer and pins on the inside.

It will be obvious from the foregoing that the sole purpose of the box or hopper is to apply the composition to the surface to be enameled, and that the object of having two plates, D D′, instead of only one, is to admit of using the hopper as a means of applying the composition to the surface to be enameled; and it will also be obvious that the sole purpose of the ways is to hold the apparatus when at rest and when adjusting the parts, and to relieve the edges of the molding from the duty of guiding the carriage longitudinally; and although the best results will be attained by the employment of all the parts in connection, as above described, I do not wish to be understood as limiting my claim to such use in connection, as some parts of my said invention may be used to advantage without others; nor do I wish to be understood as limiting my claim to the modes of construction specifically described and suggested, as other modes of construction involving the principle or mode of operation which I have invented may be adopted.

I do not wish to be understood as claiming, broadly, the use of a scraper formed to fit the molding to be enameled.

What I claim as my invention, and desire to secure by Letters Patent, in coating or enameling the surface of moldings, is—

1. The employment of a plate whose lower edge is formed the reverse of the transverse form of the molding to which it is applied, when such plate is made self-adapting to the surface of the molding during the longitudinal movement, substantially as herein described, and for the purpose set forth.

2. The employment of a hopper to contain the composition for enameling, when the lower edges of the end plates thereof are formed the reverse of the transverse form of the molding, and the molding to be enameled is employed as the bottom of such hopper, substantially as described, and for the purpose set forth.

ROBT. MARCHER.

Witnesses:
PETER VAN ANTWERP,
THOS. VAN ANTWERP.